O. H. JOBSKI.
DEMOUNTABLE RIM FOR VEHICLE WHEELS.
APPLICATION FILED MAR. 2, 1917.
1,298,050.
Patented Mar. 25, 1919.
2 SHEETS—SHEET 1.
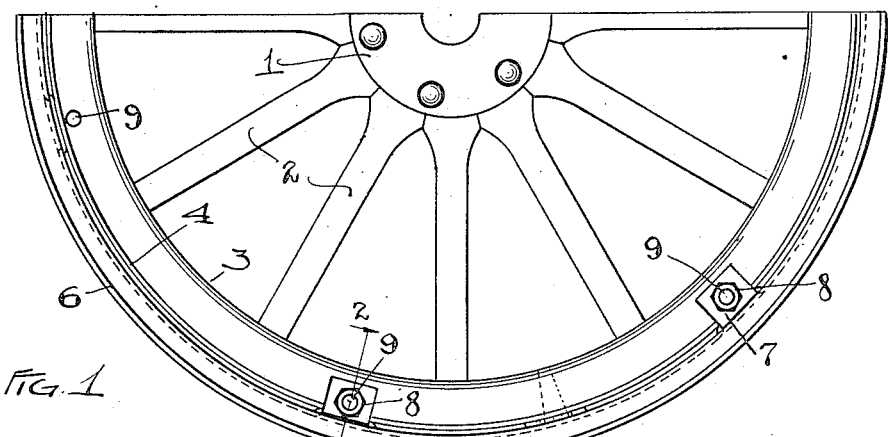
FIG. 1.
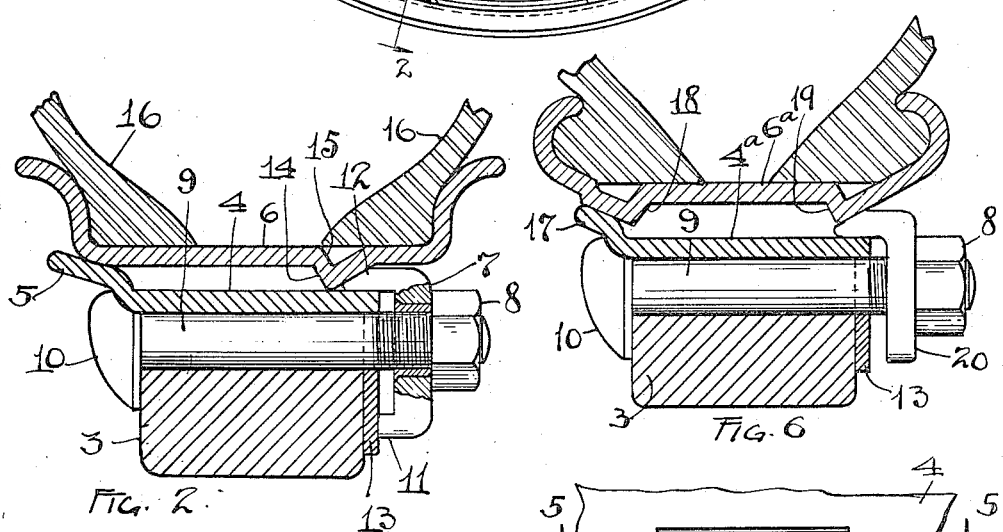
FIG. 2.
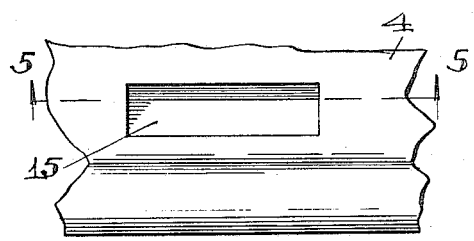
FIG. 6.
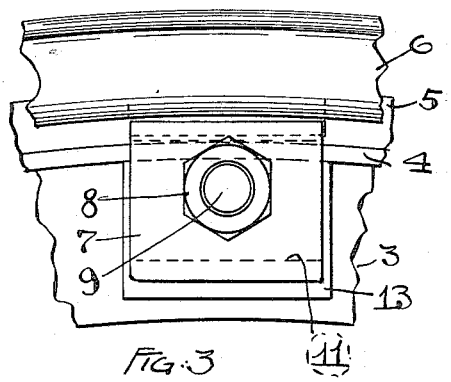
FIG. 3.
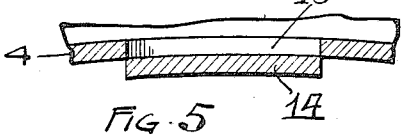
FIG. 4.
FIG. 5.
INVENTOR
Otto H Jobski
By Fay, Oberlin & Fay
ATTORNEYS O. H. JOBSKI.
DEMOUNTABLE RIM FOR VEHICLE WHEELS.
APPLICATION FILED MAR. 2, 1917.

1,298,050.

Patented Mar. 25, 1919.
2 SHEETS—SHEET 2.

INVENTOR
Otto H. Jobski
BY Fay, Oberlin & Fay
ATTORNEYS

UNITED STATES PATENT OFFICE.

OTTO H. JOBSKI, OF CLEVELAND, OHIO, ASSIGNOR TO THE STANDARD PARTS COMPANY, OF CLEVELAND, OHIO, A CORPORATION OF OHIO.

DEMOUNTABLE RIM FOR VEHICLE-WHEELS.

1,298,050.  Specification of Letters Patent.  Patented Mar. 25, 1919.

Application filed March 2, 1917. Serial No. 152,112.

*To all whom it may concern:*

Be it known that I, OTTO H. JOBSKI, a citizen of the United States, and a resident of Cleveland, county of Cuyahoga, and State of Ohio, have invented a new and useful Improvement in Demountable Rims for Vehicle-Wheels, of which the following is a specification, the principle of the invention being herein explained and the best mode in which I have contemplated applying that principle, so as to distinguish it from other inventions.

The present improvements relate more specifically to the formation of the demountable rim so as to adapt it to seat on the wheel body, and to the construction of the clamping means for securing such rim in seated position. One object of the improvements is to provide a form of rim, specifically of clencher flange type, that may be mounted on on a wheel body interchangeably with a straight side rim of the same size. Another object is to simplify the construction and operation of the clamping device, at the same time insuring the rim against distortion, and effectively locking the same in place on the wheel body. To the accomplishment of the foregoing and related ends, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 7:
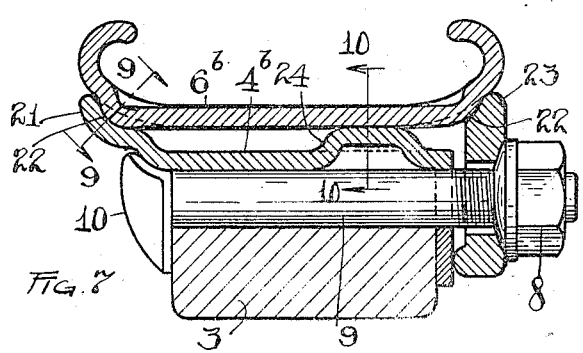
Figure 8:
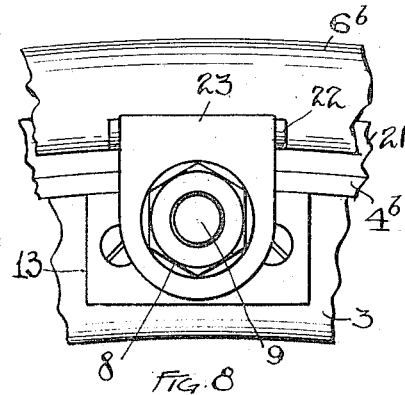
Figure 9:
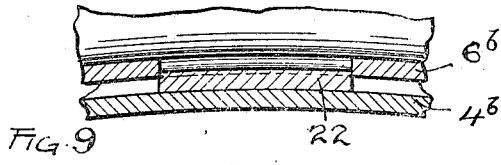
Figure 10:
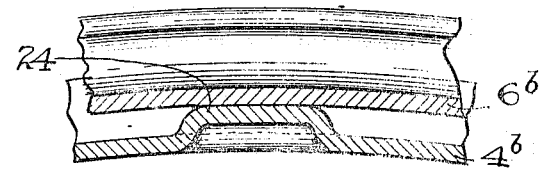
Figure 11:
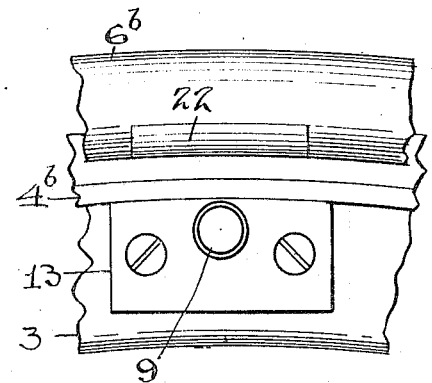
Figure 12:
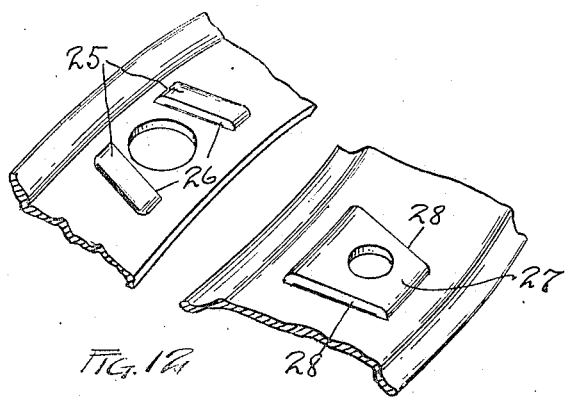

Figure 1 is a side elevational view of a portion of a wheel showing my present improved demountable rim in place thereon; Fig. 2 is a transverse section thereof and of the adjacent portions of the wheel body taken on the plane indicated by the line 2—2, Fig. 1; Fig. 3 is a side elevational view illustrating one of the clamping devices; Fig. 4 is a broken plan view of the portion of the rim designed to coöperate with such clamping device; Fig. 5 is a longitudinal section of such portion taken on the plane indicated by the line 5—5, Fig. 4; Fig. 6 is a transverse sectional view corresponding with that of Fig. 2, but showing a modification in construction; Fig. 7 is likewise a cross-sectional view corresponding with that of Fig. 2, but illustrating still another modification in construction; Fig. 8 is a side elevational view of the modified form of clamping device illustrated in Fig. 7; Fig. 9 is a sectional view of a detail taken on the plane indicated by the line 9—9, Fig. 7; Fig. 10 is a sectional view of another detail taken on the plane indicated by the line 10—10, Fig. 7; Fig. 11 is an elevational view corresponding with Fig. 8, but showing the clamping device removed; while Fig. 12 illustrates the preferred form of driving connection between the rim and wheel body, consisting of stamped up lugs on such rim and the fellyband on such wheel body, respectively.

The wheel body is shown as of familiar type, comprising, in addition to the usual wooden hub, spokes 2 and wooden felly 3, an encircling felly-band 4, the rear or inner edge of which is turned upwardly to form an outwardly inclined flange 5. The rim 6, which is likewise of familiar construction, is adapted to seat with its one edge resting on such beveled flange, and is shown in Figs. 2 and 6 as adapted to receive a straight sided tire, although this is obviously a matter of indifference, so far as concerns the principal features of interest herein disclosed.

For supporting the front edge of the rim and securing the same with its rear edge in seated position on the aforesaid flange, a plurality of devices of the sort illustrated in detail in Figs. 2 and 3, or of the alternative forms of construction illustrated in Fig. 6, and in Figs. 7 and 8, respectively, are provided, these devices being spaced circularly about the felly, in such number as may be required.

Referring, first of all, to the specific form of such device illustrated in Figs. 2 and 3, the same will be seen to consist of a clamp-plate 7 carried by a nut 8 mounted on the end of a bolt 9 that is transversely disposed in the felly 3 with its head 10 engaging the rear side of the felly-band. The clamp-plate is preferably rotatably secured to the tubular sleeve-like extension on the nut, the inner end of which is peened or spun up to form a sufficient flange to keep the plate from becoming separated from the nut.

The plate has its respective ends inwardly directed to form projections 11 and 12, the first of which is adapted to rest against a bearing plate 13 on the front of the felly, the other of which is disposed to contact with the outer surface of the felly-band, fitting in the space between the latter and the inner surface of the rim, when said rim is in place. Such last-named projection 12 is beveled, as clearly shown in Fig. 2, so as to incline outwardly away from the wheel body, and the adjacent portion of the rim is depressed (see Figs. 4 and 5), so as to form a stamped-up beveled lug 14 projecting inwardly from said rim and inclined outwardly toward the same in a fashion complementary to the beveled projection on said clamping plate. These stamped-up beveled lugs have their inner faces more sharply inclined in the opposite direction, and come close enough to contacting with the felly-band to serve as centering means for the rim; that is, as the rim is moved transversely of the wheel body with its rear edge in seated position on the flange, these lugs ride up on the front edge of the felly-band and force the rim into approximately true circular shape if it be slightly distorted under the stress of the air-pressure in the inflated tire carried thereby.

It will be observed that, as shown in Fig. 2, the transverse extent of the depressions 15 formed in the bottom of the rim by the stamped-up lugs, is less than that of the corresponding bead 16 of the tire shoe carried by the rim. In other words, these depressions are entirely covered over by such bead, and any danger of the inner tube either blowing out or becoming pinched in such depressions is thus obviated.

In Fig. 6, the felly-band 4ᵃ is shown with a somewhat different form of flange 17 on its rear edge, and in order to accommodate the rim 6ᵃ thereto the latter is provided with integral stamped-up beveled lugs 18 in circumferentially spaced relation around its inner edge as well as with lugs 19 similar to those previously described around its outer edge. The beveled faces of the lugs 18 incline in a direction corresponding with the inclination of the flange 17 and seat firmly thereon, when the rim is in place. A modification in the form of the clamp-plate 20 is also shown in that the lower projection is omitted.

In this second form of clamping device, as well as that shown in Fig. 2, the beveled projection is designed to move in a strictly rectilinear direction parallel with the axis of the bolt, instead of in the oscillatory fashion characteristic of the clamping wedges used in connection with the familiar Continental type demountable rim. Resting, as the beveled projections do, flatly on the felly-band, there is no tendency for them to bend the ends of the bolts, as frequently occurs in the type of rim just mentioned, and the accurate centering of the rim is not disturbed, while at the same time an effective locking action is secured.

In the construction illustrated in Figs. 7 to 11, inclusive, still another form of beveled flange 21 is shown on the rear edge of the felly-band 4ᵇ, such flange having more of a curved effect than the two shown in Figs. 2 and 6 respectively, such as is adapted to coöperate with a straight side rim, but not with a clencher flange rim. However, by forming such clencher flange rim 6ᵇ with integral stamped-up lugs 22 having rounded beveled faces instead of flat beveled faces, as in the preceding forms, the clencher rim may be equally securely seated on such a felly-band. The clamping plates 23 employed in connection with this construction, however, instead of having projections that enter into the space between the rim and felly-band, extend out far enough to engage with the adjacent rounded beveled lugs 22 and exert principally a lateral clamping action with less of the wedging effect than in the case of the other designs.

In order to insure the accurate centering of the rim in this construction, I preferably stamp up radial projections 24 on the felly-band 4, integral therewith, and having their outer faces beveled so that the rim will ride up onto them as it is shoved into place on the wheel body. The circumferential extent of these lugs may be varied as found desirable.

In Fig. 12, as previously indicated, there is shown a preferred form of driving connection between the rim and felly-band such as is particularly adapted for use with a rim of the form illustrated in Fig. 1, which is not reversible. In other words, such rim obviously requires to be placed on the wheel body with the side having the beveled lugs turned outwardly. Accordingly, I dispose the driving lugs 25 on the felly-band, such lugs being of the integral stamped up form shown and described in Patent No. 1,153,482 to R. S. Bryant, with their juxtaposed, shouldered faces 26 converging toward the inner edge of the felly-band. The driving lug 27 on the rim, which is similarly stamped-up integrally from the material of such rim, is formed with complementary angularly related shoulders 28, so that the rim can only be placed on the wheel-body when the smaller end of such lug is directed inwardly, as will be readily understood.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention :—

1. In a vehicle wheel, the combination with a wheel body and a rim adapted to seat demountably thereon; of means adapted to secure said rim in such seated position, said means including integral, stamped-up beveled lugs projecting inwardly toward the same and transversely movable clamps on said wheel-body having complementary beveled portions adapted to engage with said lugs.

2. In a vehicle wheel, the combination with a wheel body and a rim adapted to seat demountably thereon; of means adapted to secure said rim in such seated position, said means including integral, stamped-up beveled lugs projecting inwardly from said rim and inclining outwardly toward the same and transversely movable clamps on said wheel-body having complementary beveled portions adapted to engage with said lugs, but otherwise entirely to clear said rim.

3. In a vehicle wheel, the combination with a wheel body and a rim adapted to seat demountably thereon; of means adapted to secure said rim in such seated position, said means including integral, stamped-up beveled lugs projecting inwardly from said rim and inclining outwardly toward the same, transversely disposed bolts in said wheel-body, nuts on said bolts, and clamp-plates carried by said nuts having beveled projections complementary to and adapted to engage with said lugs.

4. In a vehicle wheel, the combination of a wheel-body; a felly-band surrounding the same having a transversely beveled, outwardly inclined flange of curved cross-section along its one edge; a rim adapted to seat demountably on said wheel-body, with inwardly projecting lugs adjacent its respective sides, the lugs along one side being curved transversely to correspond and engage with the flange on said felly-band; and transversely movable clamps on said wheel-body having portions adapted to engage with the lugs along the other side of said rim.

5. In a vehicle wheel, the combination of a wheel-body; a felly-band surrounding the same having a transversely beveled, outwardly inclined flange of curved cross-section along its one edge; a rim adapted to seat demountably on said wheel-body, with inwardly projecting, outwardly inclining beveled lugs adjacent its respective sides, the lugs along one side being curved transversely to correspond and engage with the flange on said felly-band; and transversely movable clamps on said wheel-body having complementary beveled portions adapted to engage with the lugs along the other side of said rim.

6. In a vehicle wheel, the combination of a wheel-body; a felly-band surrounding the same having a transversely beveled, outwardly inclined flange along its one edge; a rim adapted to seat demountably on said wheel-body, with inwardly projecting, outwardly inclining beveled lugs adjacent its respective sides, the lugs along one side being adapted to engage with the flange on said felly-band; and transversely movable clamps in said wheel-body having complementary beveled portions adapted to engage with the lugs along the other side of said rim but otherwise entirely to clear said rim.

7. In a vehicle wheel, the combination of a wheel-body; a felly-band surrounding the same having a transversely beveled, outwardly inclined flange along its one edge; a rim adapted to seat demountably on said wheel-body, with inwardly projecting, outwardly inclining beveled lugs adjacent its respective sides, the lugs along one side being adapted to engage with the flange on said felly band; transversely disposed bolts on said wheel-body; nuts on said bolts; and clamp-plates carried by said nuts having beveled projections complementary to and adapted to engage with the lugs along the other side of said rim.

Signed by me, this 26th day of February, 1917.

OTTO H. JOBSKI.